(12) United States Patent
Cutt (10) Patent No.: US 12,464,627 B2
(45) Date of Patent: Nov. 4, 2025

(54) MULTI-DIRECTIONAL LIGHTING DEVICE

(71) Applicant: Zachary Cutt, Barrie (CA)

(72) Inventor: Zachary Cutt, Barrie (CA)

( * ) Notice: Subject to any disclaimer, the term of this patent is extended or adjusted under 35 U.S.C. 154(b) by 0 days.

(21) Appl. No.: 17/666,540

(22) Filed: Feb. 7, 2022

(65) Prior Publication Data

US 2022/0264726 A1    Aug. 18, 2022

Related U.S. Application Data

(60) Provisional application No. 63/149,239, filed on Feb. 13, 2021.

(51) Int. Cl.
| | |
|---|---|
| *H05B 47/155* | (2020.01) |
| *F21L 2/00* | (2006.01) |
| *F21L 4/02* | (2006.01) |
| *H05B 47/19* | (2020.01) |
| *F21Y 115/10* | (2016.01) |

(52) U.S. Cl.
CPC .............. *H05B 47/155* (2020.01); *F21L 2/00* (2013.01); *F21L 4/02* (2013.01); *H05B 47/19* (2020.01); *F21Y 2115/10* (2016.08)

(58) Field of Classification Search
None
See application file for complete search history.

(56) References Cited

U.S. PATENT DOCUMENTS

| | | | |
|---|---|---|---|
| 7,434,955 B2 | 10/2008 | Vickers et al. | |
| 7,461,944 B2 | 12/2008 | Alessio | |
| 8,066,403 B2 | 11/2011 | Sanfilippo et al. | |
| 8,344,543 B2 | 1/2013 | Allen | |
| 9,170,006 B2 | 10/2015 | Cugini et al. | |
| 9,383,072 B2 | 7/2016 | Macor | |
| 9,521,713 B2* | 12/2016 | Niebert | H05B 47/18 |
| 10,274,190 B2 | 4/2019 | Matte et al. | |
| 11,149,909 B2 | 10/2021 | Maglica et al. | |
| 2009/0097242 A1* | 4/2009 | Hsieh | F21V 21/005 |
| | | | 362/257 |
| 2013/0322082 A1* | 12/2013 | Hollander | F21S 8/04 |
| | | | 362/249.02 |
| 2019/0132928 A1* | 5/2019 | Rodinger | F21V 23/06 |

FOREIGN PATENT DOCUMENTS

CA        2932108 C    12/2016

\* cited by examiner

*Primary Examiner* — Anh Q Tran (57) ABSTRACT

A method for reducing or eliminating shadows and spreading light around a work area or throughout multiple rooms and spaces, without the need to frequently readjust, the system comprised of at least one or more lighting devices, coupled with a set of attachment mechanisms to link or detach additional light sources, a set of electrical connections for power and data transmission, at least one mounting feature, at least one battery and a controller comprising program instructions executed by a processor to cause the lighting device to change modes, brightness and to send the command wirelessly or through connections to additional lighting devices, charge at least one battery and transfer power to additional connected lighting devices.

8 Claims, 10 Drawing Sheets

MULTI-DIRECTIONAL LIGHTING DEVICE

FIELD OF INVENTION

The present invention relates to a portable, multi-directional light source for personal lighting use.

BACKGROUND

Battery powered light sources are commonly used at home, while working in the garage, inside electrical panels, underneath cabinets and in attics. They can be useful, and sometimes critical in scenarios such as camping, emergency preparedness, hiking and cycling. Additional uses include, but are not limited to, accent lighting, safety lighting, temporary event lighting, beacons and indicators. The goal of battery light sources is to supplement or enhance lighting such that activities can be completed safely, efficiently and without error. Aiming and directing the light source is a common challenge that is situationally dependant, and often results in the user periodically adjusting the light source to ensure adequate light coverage. Despite careful light source selection and setup, eliminating and reducing shadows can still be difficult due to traditional design of single point light sources.

Many light source styles exist, for example, flood lights, throw lights, lanterns, headlights, treble lights and clip lights. However, these light styles suffer from drawbacks such as shadows, difficulty to position or aim and poor light coverage. Furthermore, evolution of these devices has been stagnant over recent years beyond these categories. Constraints of each light source vary, for example, flood lights are generally bulky and not suitable when working in tight spaces on an automobile. Cylindrical throw lights are often small, but difficult to position and aim. They are also not suitable to spread light evenly throughout a room and their shape can cause them to tip and roll. Lanterns can be effective to light a room but are often inadequate in tight areas. Headlights can illuminate directly in front of a user's head, but it is not always possible to aim in the correct direction while working. Aiming and readjusting any style of light can be time consuming and cause the user to break focus from the task at hand. All of the previously mentioned lighting styles lack any solutions to incessant shadows, the need to constantly reposition or aim the light source or lighting multiple areas and directions.

It is an object of the present invention to mitigate or obviate at least one of the above-mentioned disadvantages.

SUMMARY OF THE INVENTION

In one of its aspects, there is provided a system for reducing or eliminating shadows and spreading light around a work area or throughout multiple rooms and spaces, without the need to frequently readjust, the system comprising:
  at least one lighting device;
  a set of attachment mechanisms configured to link or detach additional lighting devices;
  a set of electrical connections configured for power and data transfer;
  at least one mounting feature;
  at least one lens;
  at least one battery
  a controller comprising program instructions executed by a processor to at least cause:
    the at least one lighting device to change modes or brightness and output the command wirelessly or through electrical connections to additional lighting devices
    the lighting device to charge the at least one battery and deliver power to other connected lighting devices In another one of its aspects, there is provided a method for reducing or eliminating shadows and spreading light around a work area or throughout multiple rooms and spaces, without the need to frequently readjust, the method comprising the steps of:
  (a) determining the area required to be illuminated
  (b) separating the multi-area lighting device into individual point source lighting devices or configuring into groups of lighting devices
  (c) affixing mounting attachments specific to each lighting device, as required
  (d) mounting each lighting device generally aimed towards the work area
  (e) selecting beam or flood mode and brightness set point for each individual lighting device Advantageously, the multi-directional light source allows light to be dispersed from different angles, in multiple rooms or areas at once, with reduced time spent positioning and aiming, increased productivity, greater flexibility and improved performance. In addition, the multi-directional light source minimizes common pain points such as tipping, rolling, difficulty fitting in tight spaces and difficulty mounting in desired locations. The standard mounting features allow for future expansion of the system to meet the user's evolving demands.

DETAIL DESCRIPTION OF EXEMPLARY EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Like reference numerals are used to designate like parts in the accompanying drawings.

The detailed description provided below in connection with the appended drawings is intended as a description of the present examples and is not intended to represent the only forms in which the present example may be constructed or used. However, the same or equivalent functions and sequences may be accomplished by different examples.

Figure 1A:
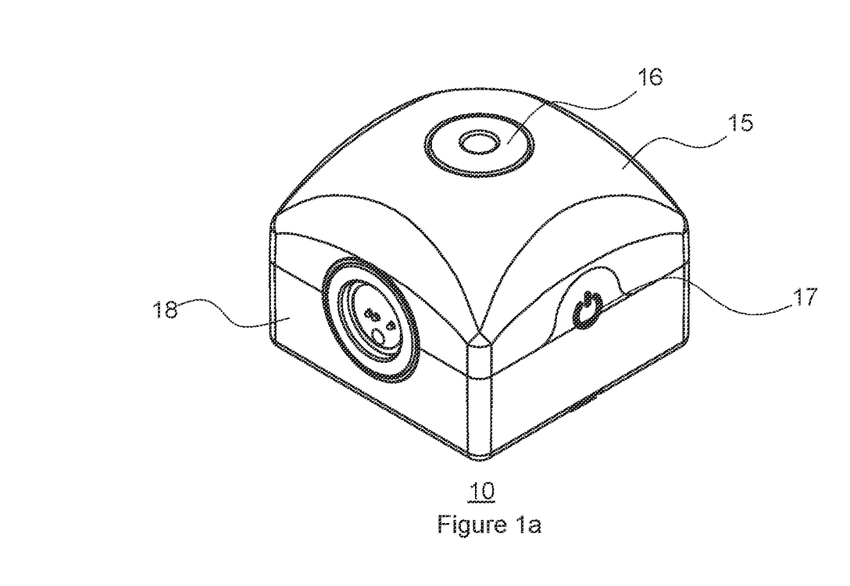
FIG. 1a to 1d shows plan views of an exemplary lighting device.
Figure 1B:
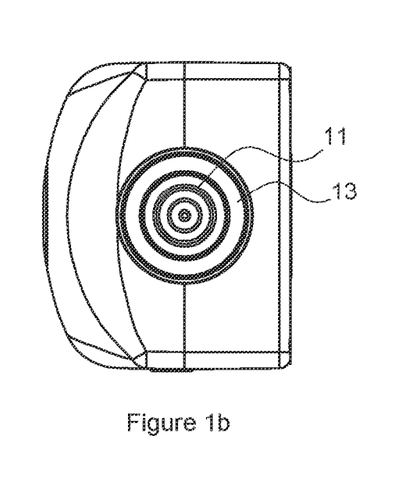
Figure 1C:
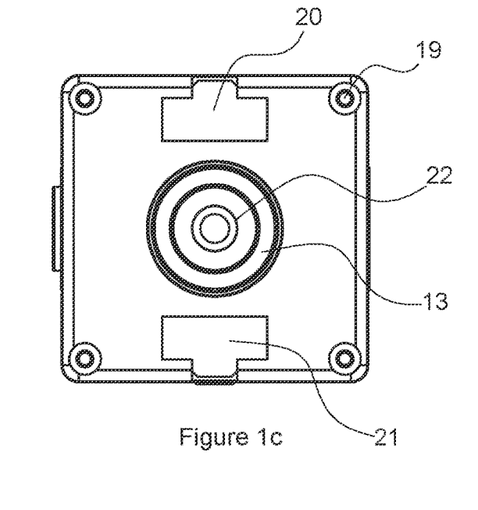
Figure 1D:
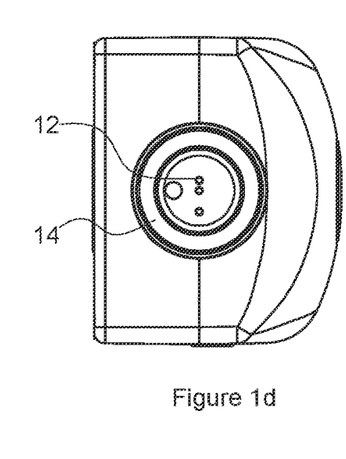
Figure 2:
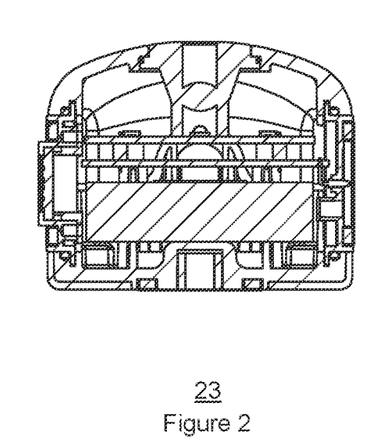
FIG. 2 shows a section view of an exemplary lighting device.

Referring to FIGS. 1a-d, there is shown a lighting device capable of supplying light from a single point, generally identified by numeral 10 in an exemplary embodiment. FIG. 1b shows ring connector 11, while FIG. 1d oppositely shows a pin connectors 12. FIGS. 1b-1c shows south magnet 13 while FIG. 1d shows north magnet 14. Lighting device 10 comprises flood lens 15 and beam lens 16 to distribute light as needed, controlled by switch 17. Base 18 contains internal components and is fixed to flood lens 15 by way of screw 19, or other fixing means. Charge port cover 20 is along side power supply port cover 21 located next to threaded insert 22 used for mounting to standard equipment such as tripods. Section view FIG. 2 provides an exemplary configuration of internal components and is generally represented by numeral 23.

Figure 3A:
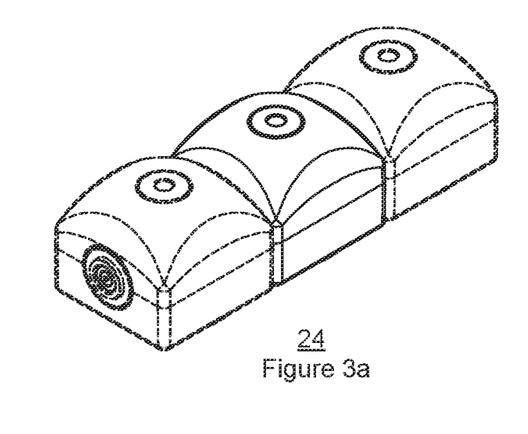
FIGS. 3a to 3c show views detailing exemplary positions to assemble the lighting devices
Figure 3B:
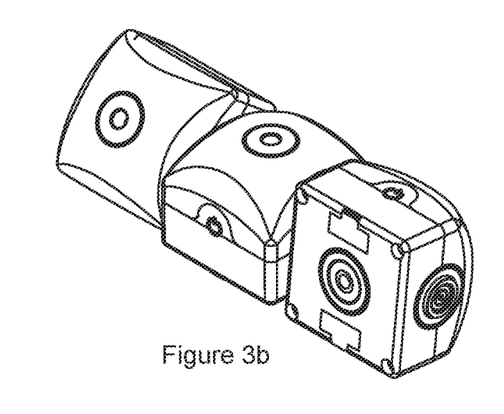
Figure 3C:
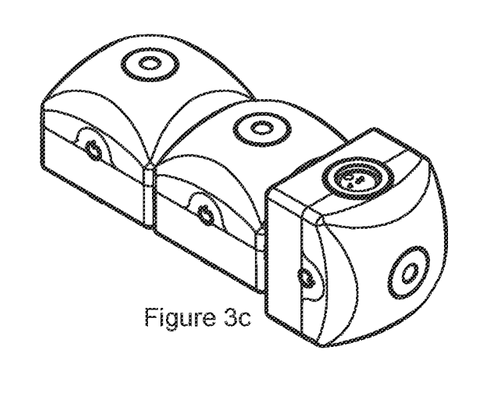

Now referring to FIGS. 3a-3c, lighting device 10 is shown connected via south magnet 13 and north magnet 14 to form light set 24. Light set 24 can be expanded by adding additional lighting device 10 and can be positioned rotatably about south magnet 13 and north magnet 14 as displayed in FIG. 3b so that light can be directed multiple directions. Light set 24 can also be assembled with north magnet 14 connected to south magnet 13, back to side, as depicted in FIG. 3c. Light set 24 can be used as a whole or split into multiple lighting device 10 that can be placed in different areas or rooms and to provide light from multiple angles.

Figure 4A:
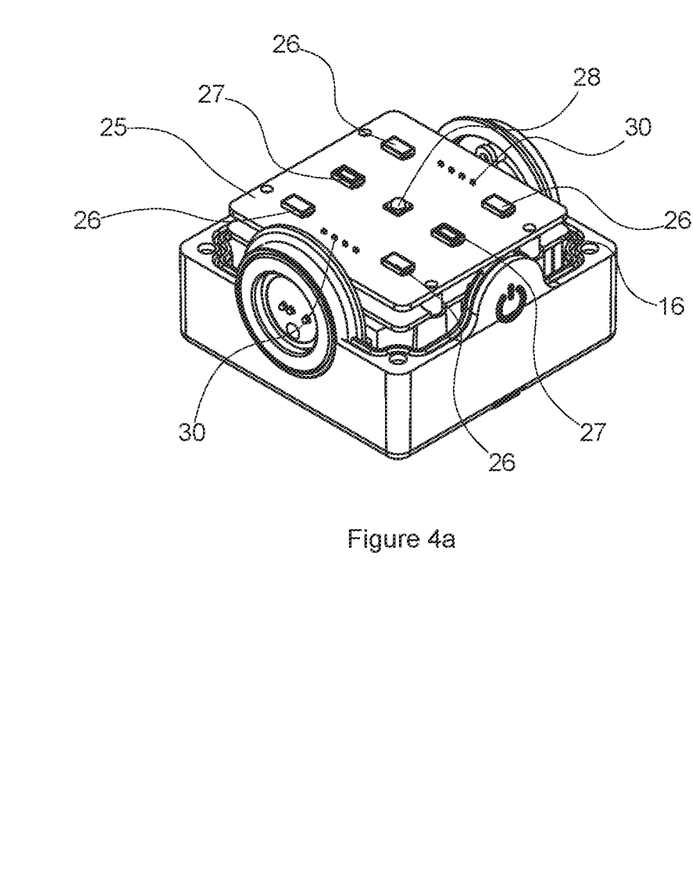
FIGS. 4a and 4b show additional views of an exemplary lighting device with lens hidden
Figure 4B:
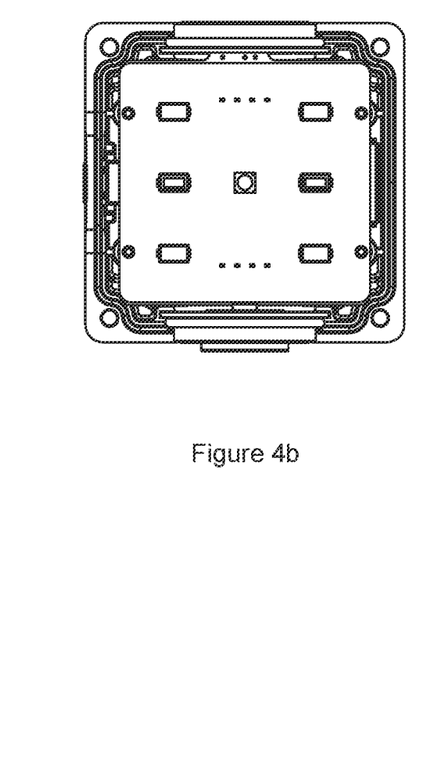

Next, FIGS. 4a and 4b show lighting device 10 with flood lens 15 removed. Internally, printed circuit board 25 is shown with flood led 26, red led 27 and beam led 28. Multiple flood led 26 surround the beam led 28 positioned to illuminate flood lens 15. Beam led 28 is centrally located positioned to project through beam lens 16. Secondary printed circuit board 29 is connected to printed circuit board 25 through pin header 30 and provides connection points for devices, as discussed later.

Figure 5:
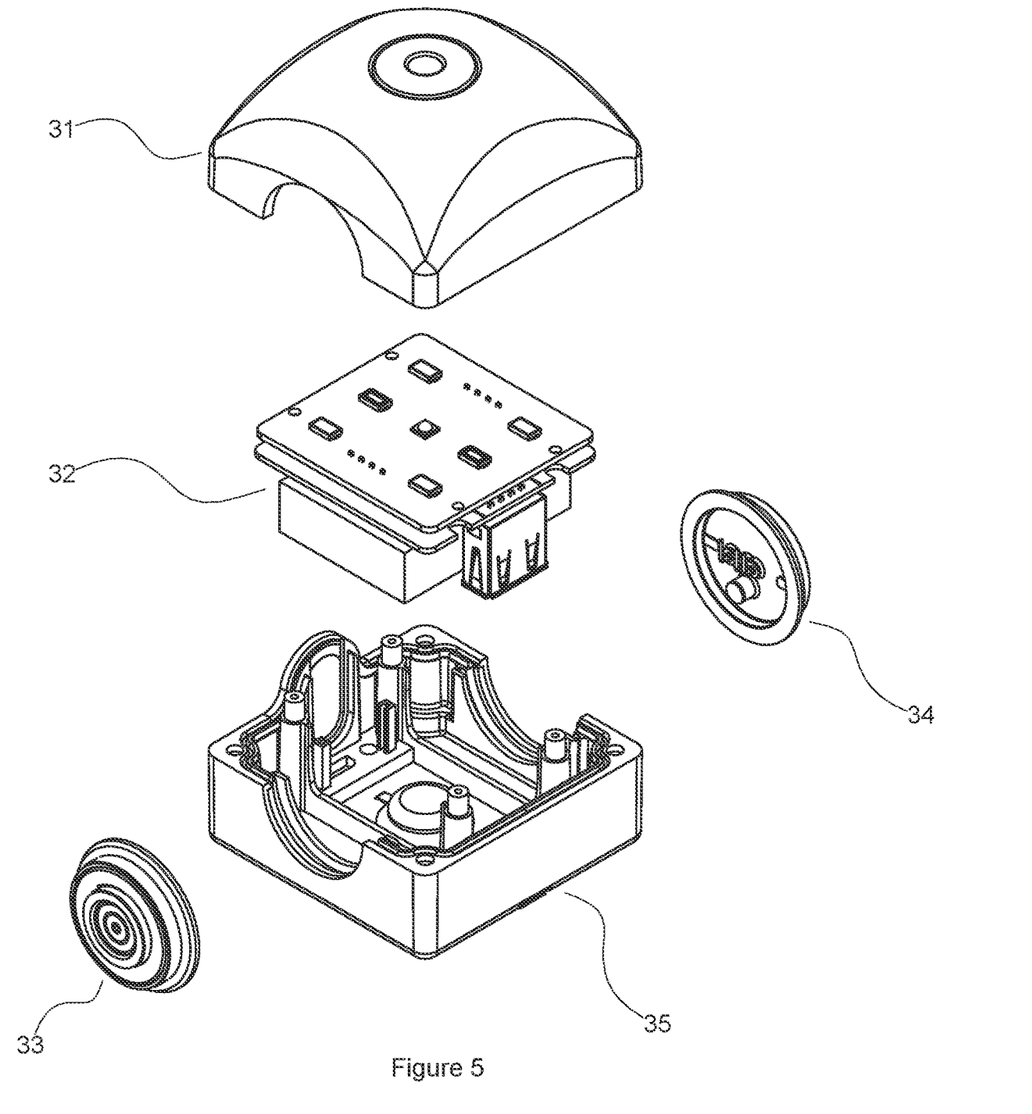
FIG. 5 shows an exploded view of an exemplary lighting device's sub assemblies

FIG. 5 displays subassemblies within lighting device 10. Starting with lens assembly 31, then electronics assembly 32, then base assembly 35. To the left, ring connector assembly 33 is pictured with pin connector assembly 34.

Figure 6:
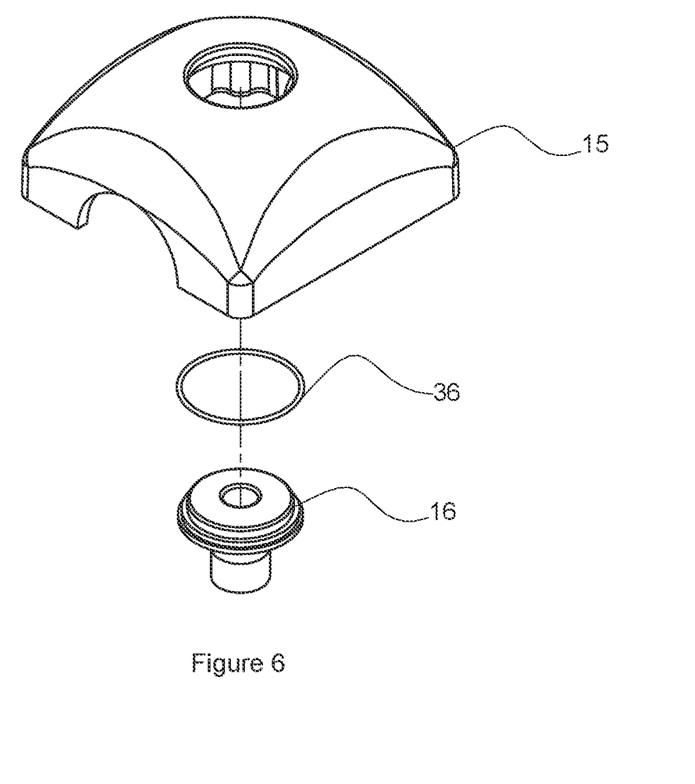
FIG. 6 shows an exploded view of an exemplary lighting device's lens assembly

FIG. 6 displays an exploded view of lens assembly 31 in which beam lens 16 is pressed into flood lens 15 with rubber ring 36 which provides sealing to the joint. This lens assembly 31 provides two ways to disperse light depending on the needs of the user, either a flood mode to spread light evenly throughout an area or a beam mode to project light at a distance.

Figure 7:
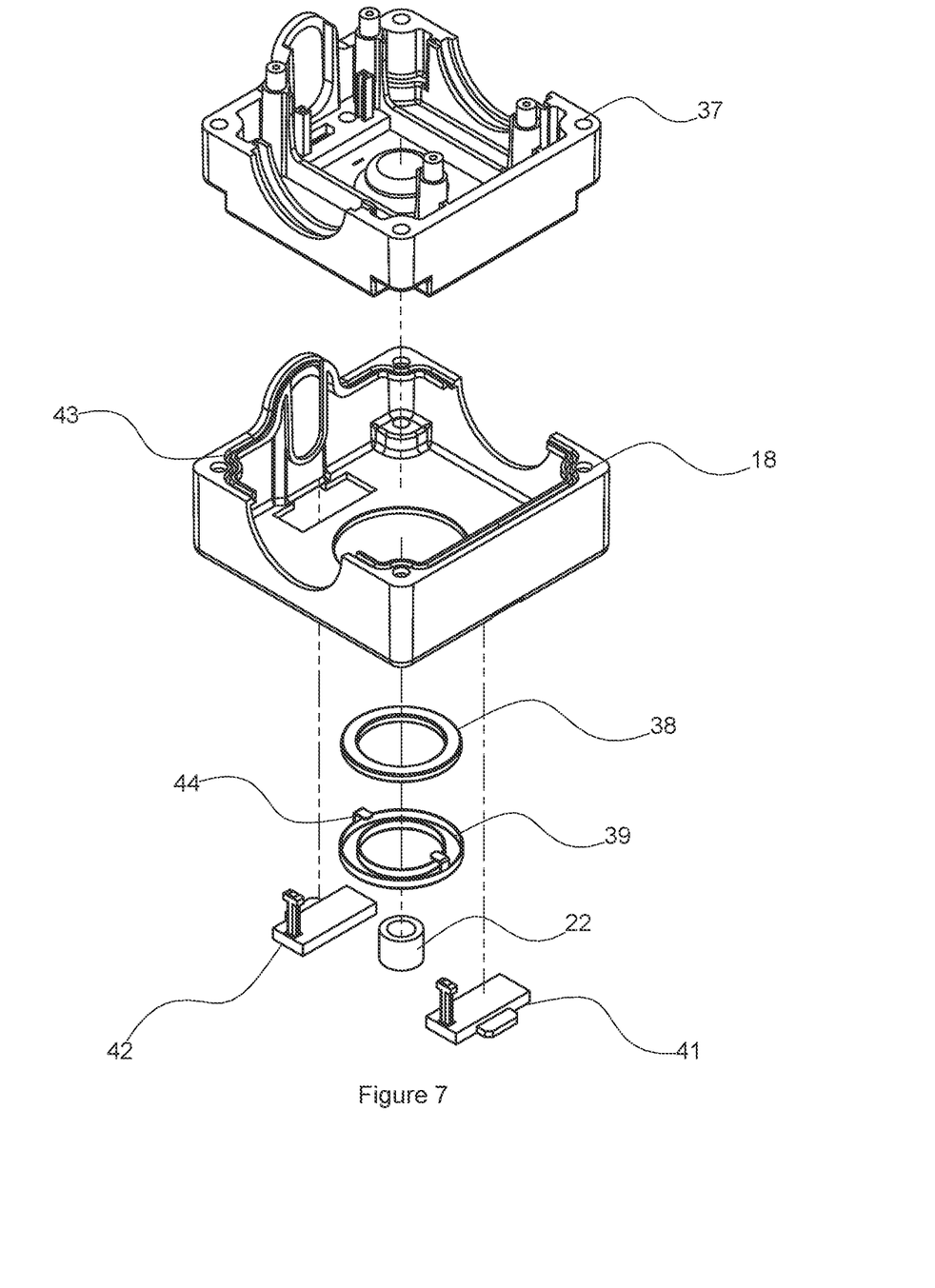
FIG. 7 shows an exploded view of an exemplary lighting device's base assembly

FIG. 7 details an exploded view of base assembly 35 in which base 18 can be seen with inner structure 37 separated. Inner structure 37 is made by way of injection molding and designed such that the use of mold slides to create holes and undercuts is not needed. This ensures mold costs and maintenance is minimized. Base 18 is a rubber over-mold of inner structure 37 as part of a two part molding sequence. This over-mold provides a grippy outer surface to prevent movement, improve feel and scratch resistance while also creating base seal 43 to prevent the intrusion of dust or moisture into the assembly. This dual-purpose feature reduces design complexity and manufacturing assembly costs. Magnet 38 is fitted into magnet bracket 39 which provides a method of mechanical fixing to inner structure 37 through a set of slots and bendable tabs 44. These bendable tabs allow for fast assembly and permanent, mechanical installation unlike alternative fixing methods. A sealing compound shall be used to seal the penetration location. Threaded insert 22 is molded or ultrasonically inserted into a receiving hole in inner structure 37 to allow for a solid mounting point. The thread diameter and pitch is standard to permit use with commonly available accessories such as tripods, stands, suction cups, clips and clamps to facilitate efficient setup means of lighting device 10. Charging port cover 41 and battery backup port 42 are pushed into position to seal the ports from water and dust intrusion.

Figure 8:
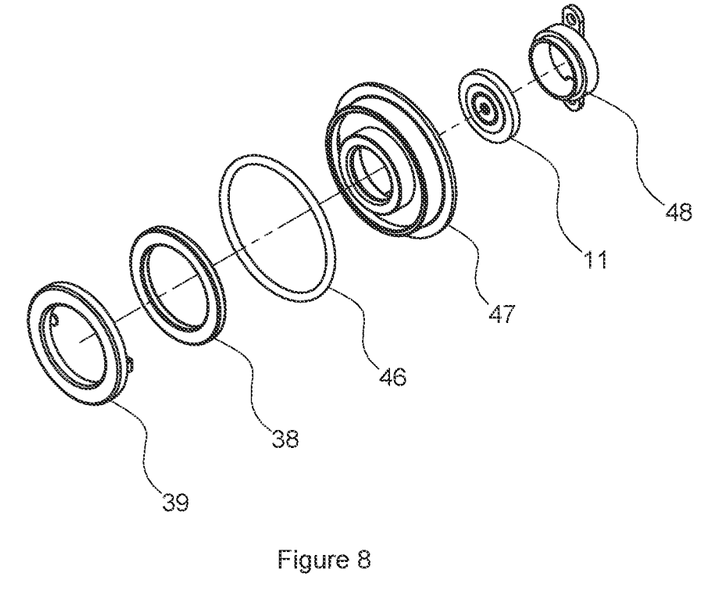
FIG. 8 shows an exploded view of an exemplary lighting device's ring connector assembly

FIG. 8 exemplifies a ring connector assembly 33 in an exploded view. Ring connector 11 is constructed as a printed circuit board and pressed into ring connector housing 47 with additional element, ring connector keeper 48 fastened in position to mechanically fix ring connector 11. Magnet 38 and magnet bracket 39 are fastened with bendable tabs 44 as described previously. Rubber ring 46 surrounds ring connector housing 47 to create a water and dust resistant seal with inner structure 37 and flood lens 15. Ring connector 11 provides multiple concentric metallic rings to transmit power and communication to other attached lighting device 10 as seen in light set 24. The circular contacts allow power and communication to be transmitted regardless of lighting device 10 rotational orientation, as exemplified in FIG. 3b.

Figure 9:
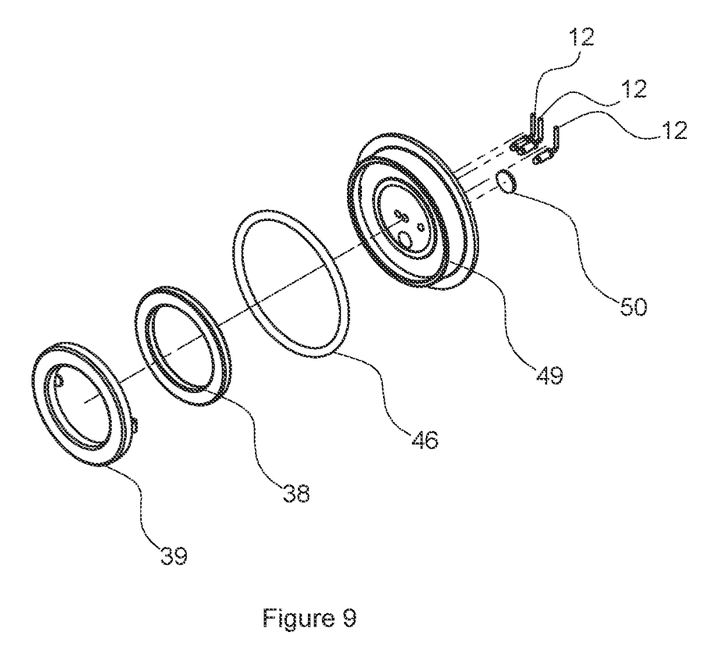
FIG. 9 shows an exploded view of an exemplary lighting device's pin connector assembly

FIG. 9 exemplifies a pin connector assembly 34 which opposes mating connector, ring connector assembly 33. Similarly constructed, magnet 38 and magnet bracket 39 are fastened to pin connector housing 49 with rubber ring 46 providing a water and dust resistant seal with inner structure 37 and flood lens 15. Membrane 50, acts as a vent to relieve pressure differentials between the interior of lighting device 10 and outer atmospheric pressure conditions. A differential of pressure is usually formed due to the heating and cooling cycles of the electronics contained in the housing, which results in added pressure on the seals. The seals ultimately break down allowing moisture to enter the enclosure, then resulting in condensation which can lead to electronic failures and light output reductions. Membrane 50 allows the pressure to equalize reducing this effect and therefore preventing condensation. Pin connector 12 is spring loaded and affixed to pin connector housing 49 and protrudes to make contact with ring connector 11 when lighting device 10 is attached as detailed in FIGS. 3a and 3b. The connection of pin connector 12 to ring connector 11 is maintained by spring pressure regardless of orientation of lighting device 10. This connection facilitates the transfer of power and communication between multiple lighting device 10.

Figure 10:
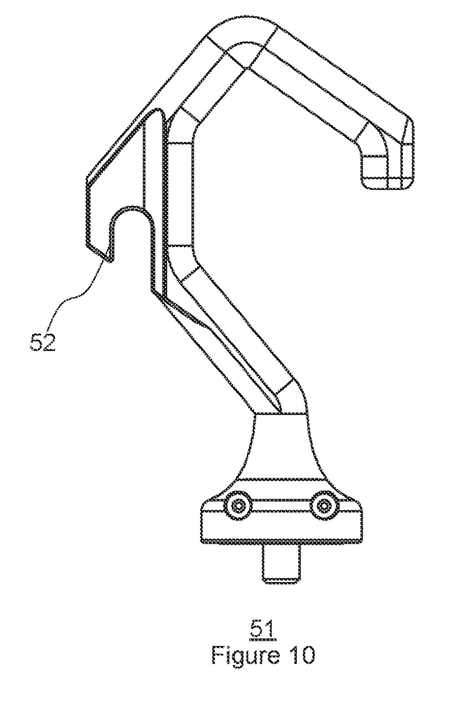
FIG. 10 shows a plan view of an exemplary removable hook

FIG. 10 illustrates a detachable hook 51 which is used to conveniently mount lighting device 10 or light set 24 by way of magnet or via threaded insert 22. Additional mounting accessories can be created using the standard thread and magnet features. Detachable hook 51 is useful for hanging light set 24 on a car hood above an engine, below a kitchen sink when working on plumbing or in a tent when camping, for example. Auxiliary hook 52 is useful for hanging on thin edges such as sheet metal or wire and round bar. Detachable hook 51 is also useful when attached to lighting device 10 to provide a stand to lean at adjustable angles depending on the hook orientation.

Figure 11:
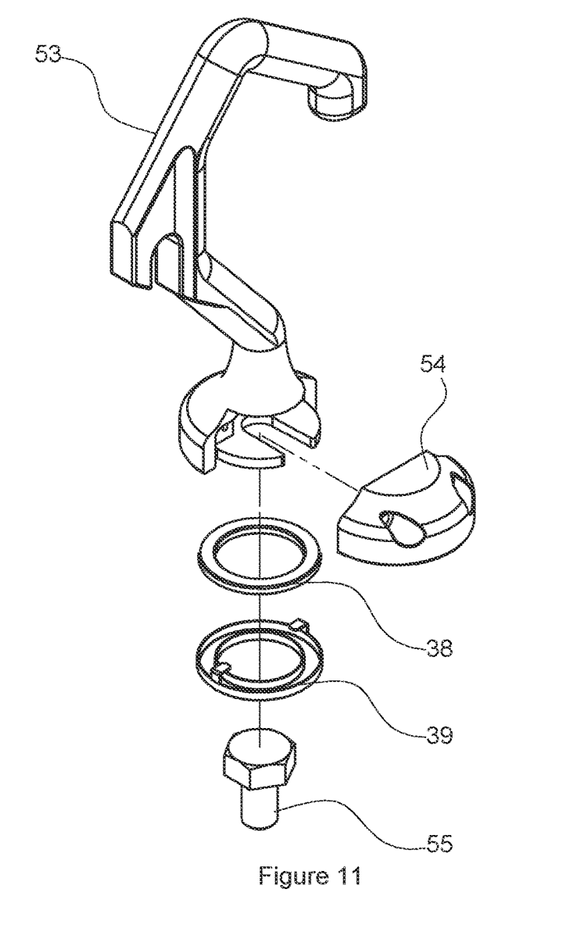
FIG. 11 shows an exploded view of an exemplary removable hook
Figure 12A:
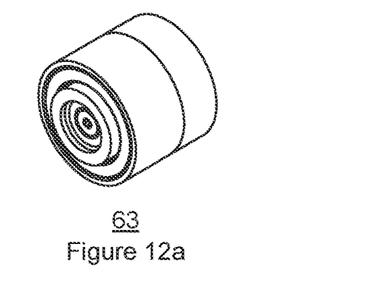
FIGS. 12a to 12d shows plan views of an exemplary charging attachment
Figure 12B:
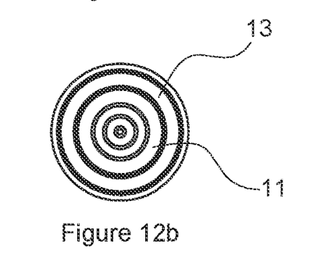
Figure 12C:
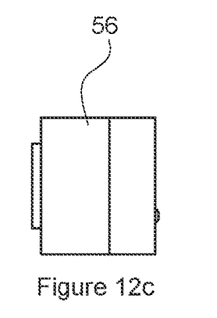
Figure 12D:
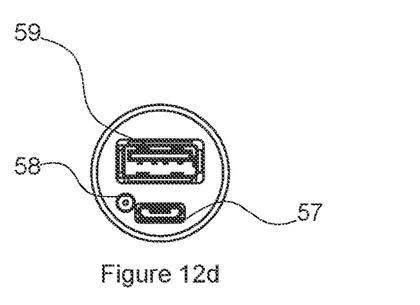

FIG. 11 details an exploded view of the construction of detachable hook 51. Hook structure 53 is injection molded without the use of mold slides due to its design to reduce mold complexity and cost. Bolt 55 is inserted into a hexagonal pocket in hook structure 53 such that it is captured and affixed in position with cover 54 by way of screw. Bolt 55 provides a cost effective mechanical linkage to detachable hook 51. Various other mechanical or magnetic linkages can suffice for the purpose of joining detachable hook 51 and lighting device 10. As previously described, Magnet 38 and magnet bracket 39 are fixed into detachable hook 51 via bendable tabs 44.

FIGS. 12a-d visualizes an exemplary charging adapter 63. Ring connector 11 is contained in charging housing 56 with south facing magnet 13 configured to magnetically attach to north facing magnet 14 and pin connector 12. This charging adapter allows a standard USB micro cable to attach to charge port 57 to provide 5 VDC power for charging battery 62, as described later. Indicator light 58 displays charging status. Battery backup port 59 is an alternate to battery backup port 42 which may allow for reduced manufacturing costs and allows the user output 5 VDC power to charge external devices, especially when in an emergency scenario.

Figure 13:
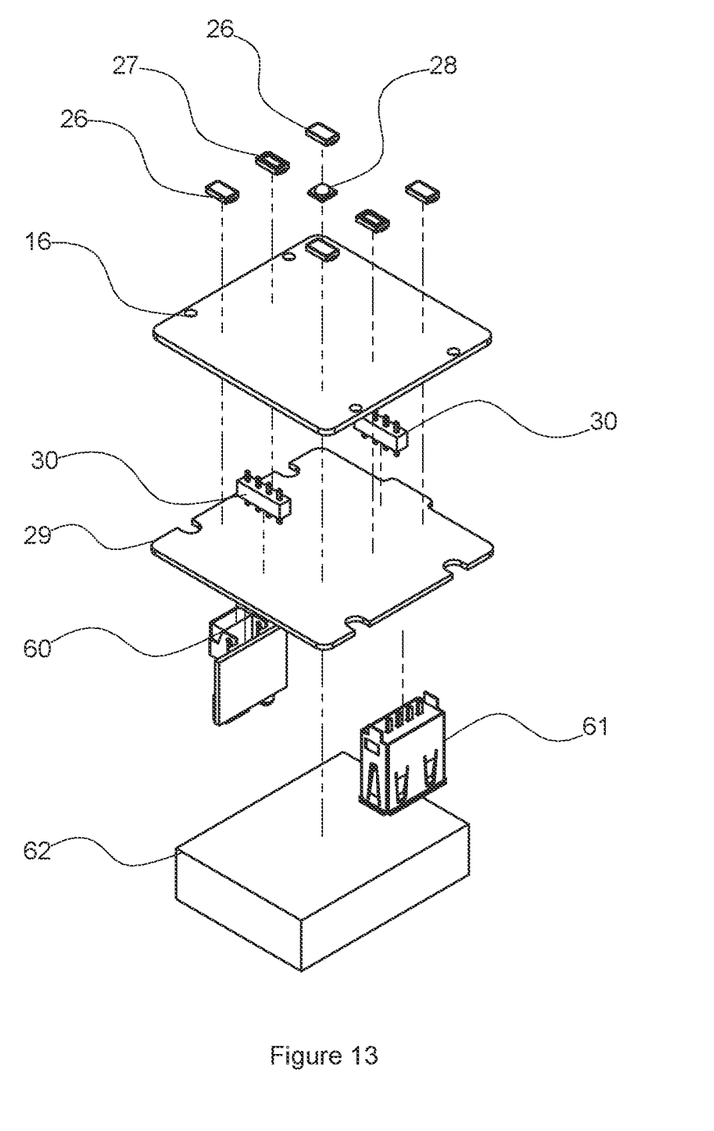
FIG. 13 shows an exploded view of an exemplary lighting device's electronic assembly

FIG. 13 details an exemplary electronics assembly 32 for a lighting device 10. A battery 62 which may be of the lithium polymer type, is connected to secondary printed circuit board 29 by means of wire. Charging port assembly 60 and battery backup port 61 are connected to secondary printed circuit board 29 to transmit power to the circuits. Charging port assembly 60 and battery backup port 61 may be replaced with charging adapter 63 and vice versa. Pin header 30 connects printed circuit board 16 and secondary printed circuit board 29. Ring connector 11 and pin connector 12 are connected to secondary printed circuit board 29 allowing for pass-thru power between several lighting devices 10. This electrical connection also allows the lighting device 10 to communicate to other connected lighting device 10. When switch 17 is depressed to initiate a mode or brightness change, the microprocessor located on secondary printed circuit board 29 sends a signal through ring connector 11 and pin connector 12 to attached lighting device 10 to trigger a change to the same mode or brightness level. This communication allows a light set 24 to act in unison when using the lighting devices 10 interconnected. Additionally, these connections allow for pass-thru charging of multiple lighting devices 10 at the same time. One lighting device 10 will distribute power to other lighting device 10 which are connected, thereby charging all batteries at the same rate or sequentially. A wireless form of communication such as Bluetooth or Wi-Fi may be included to allow simultaneous control of the lighting devices 10 when the light set 24 is physically separated as individual lighting devices 10. Finally, a series of flood led 26, red led 27 and a beam led 28 is located atop printed circuit board 16.

The invention claimed is:

1. A system for reducing or eliminating shadows and spreading light around a work area or throughout multiple rooms and spaces, without the need to frequently readjust, the system comprising:
   at least one lighting device;
   a set of attachment mechanisms configured to link or detach additional lighting devices;
   a set of electrical connections configured for power and data transmission;
   at least one mounting feature;
   at least one lens;
   at least one battery
   a controller comprising program instructions executed by a processor to at least cause:
   the at least one lighting device to change modes or brightness and output the command wirelessly or through electrical connections to additional lighting devices
   the lighting device to charge the at least one battery and deliver power to other connected lighting devices.

2. The attachment mechanisms of claim 1 wherein a circular, ring-shaped magnet allows rotational adjustment of the additional lighting devices.

3. The attachment mechanisms of claim 2 wherein a circular electrical connection is located centered, about the axis to rotate during positioning and provide continuous power and or data transmission.

4. The attachment mechanisms of claim 2 configured to link or detach additional lighting devices, thereby multiplying or dividing the light output according to the task at hand and allowing for placement of the lighting devices in independent locations.

5. The lighting device of claim 1 wherein the outer enclosure is square and flat to facilitate positioning in multiple orientations.

6. The lens of claim 1 wherein the curved shape and aspheric depressions promote light dispersion around the periphery of the device and beyond the centerline of the lighting device.

7. The lighting device of claim 1 wherein a lens projects a directional beam of light for distant lighting, and a secondary lens to disperse light at a shorter range.

8. The mounting feature of claim 1 wherein a threaded insert allows for robust attachment of a hook, hanger, clasp, clip, band, strap or equivalent.

* * * * *